March 14, 1961 P. LANDRIEU 2,974,939
METHOD OF AND APPARATUS FOR THE PRODUCTION OF GYPSUM PLASTER
Filed Dec. 22, 1958 2 Sheets-Sheet 1
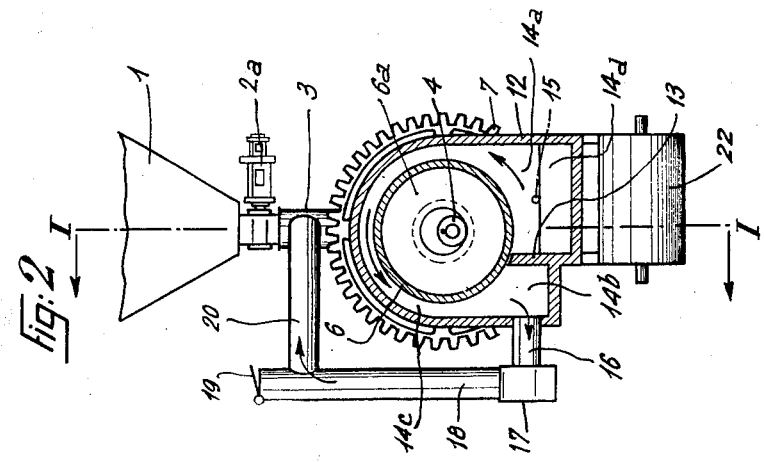
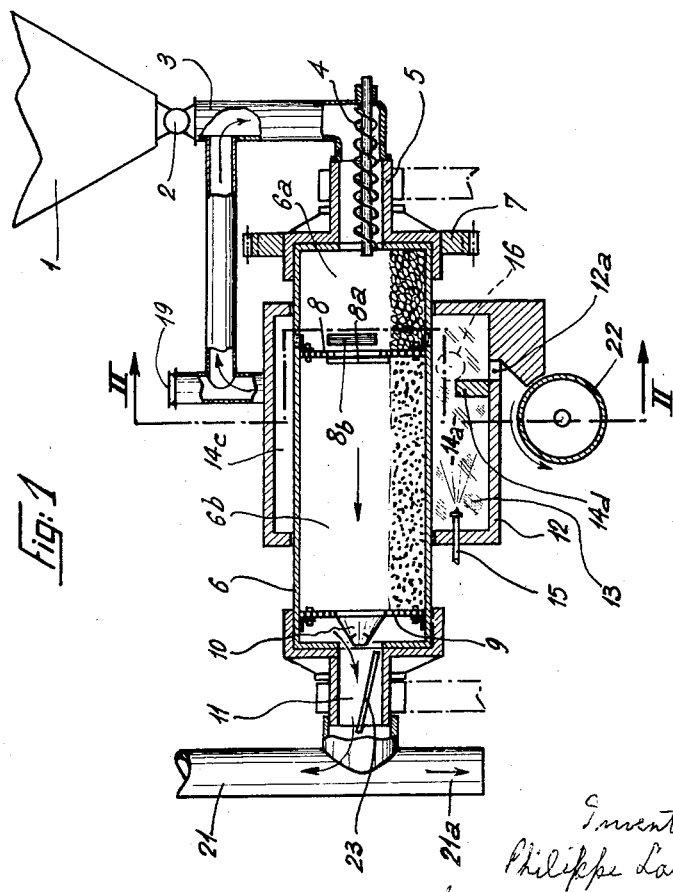
Inventor
Philippe Landrieu
by Stevens, Davis, Miller & Mosher
his attorneys March 14, 1961 P. LANDRIEU 2,974,939
METHOD OF AND APPARATUS FOR THE PRODUCTION OF GYPSUM PLASTER
Filed Dec. 22, 1958 2 Sheets-Sheet 2
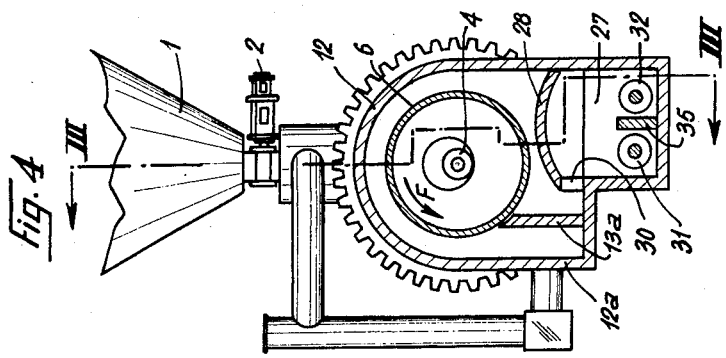
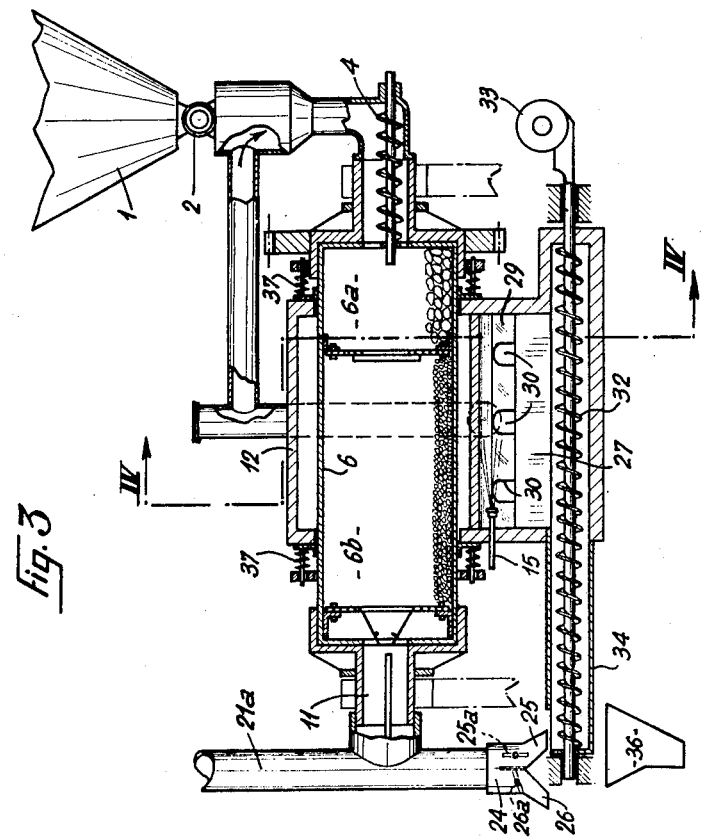
Inventor
Philippe Landrieu
by Stevens, Davis, Miller & Mosher
his attorneys

United States Patent Office 2,974,939
Patented Mar. 14, 1961

2,974,939

METHOD OF AND APPARATUS FOR THE PRODUCTION OF GYPSUM PLASTER

Philippe Landrieu, Martigues, France, assignor to Societe des Gypses et Platres de France, Marseille, Bouches-du-Rhone, France, a company of France Filed Dec. 22, 1958, Ser. No. 782,117

Claims priority, application France Jan. 3, 1958

6 Claims. (Cl. 263—33)

This invention relates to the preparation of gypsum plaster, cement plaster, plaster of Paris and similar compositions derived from a partial or total calcination and/or dehydration of gypsum, which compositions are herein generically designated by the term gypsum plaster.

Conventional preparation of gypsum plaster involves two main steps, a first step being the calcining or burning the gypsum to de-hydrate it, and a second step consisting in a crushing or grinding of the dehydrated gypsum to form a fine powder.

An object of the invention is to combine said two steps into only one, and related objects are to provide such combining of the two steps into one so as to achieve enhanced over-all thermal efficiency of the plaster producing process and consequent saving on fuel and power, increased simplicity of control and regulation permitting a reduction of the necessary manual labor and giving a higher product uniformity, substantial reduction in apparatus requirements and in the attendant equipment and maintenance costs, a wider variety of grades of finished plaster products and for a particular given plaster grade a high uniformity in production.

According to one aspect of the invention, there is provided an apparatus for producing gypsum plaster, which comprises means for continuously feeding raw gypsum material into a treating zone, grinding means within said zone, means for heating said zone externally, and means for delivering a heated gaseous medium through said zone in the same direction as said material is fed therethrough, whereby said material is simultaneously ground to a fine powder and dehydrated, and means for discharging the gypsum plaster product from said zone.

According to another aspect of the invention, there is provided an apparatus for producing gypsum plaster, which comprises a revolving drum defining a treating zone, aligned axial inlet and outlet apertures in the ends of the drum e.g. formed through the journal means supporting the drum for rotation, a loose charge of grinding elements within said drum, external heating means for said treating zone comprising a refractory enclosure surrounding at least a longitudinal midportion of the drum and means for providing heated gaseous medium in said enclosure to flow around the drum, means for delivering at least a part of the gaseous medium from the enclosure through said inlet aperture into the drum together with raw gypsum material, and means for discharging said medium out of said outlet aperture together with gypsum plaster product.

In one desirable construction, there is provided a peripheral perforate wall consisting of a set of individually replaceable grating elements secured in the cylindrical periphery of the drum within the aforementioned refractory enclosure so as to allow entry into the enclosure of a portion of the partially burned and finely crushed gypsum material to expose said material to high-temperature burning or super-firing conditions, and means for discharging the resulting super-fired plaster material from the enclosure.

The burned and ground gypsum material may be discharged in part by way of the axial outlet in the form of normally fired gypsum plaster product, and in part by way of the peripheral grating and thence by way of the discharge means as super-fired plaster product.

In a modified form of apparatus according to the invention, there are provided in the lower part of the heating enclosure a pair of substantially parallel spaced screw conveyer units for feeding at least part of the normally fired plaster discharged from the drum along a longitudinal path back through the heating enclosure, suitable means such as an internal circulation of cooling air being preferably provided for cooling the screw units.

In this last-mentioned embodiment of the invention, the peripheral grating members in the drum wall are no longer required and it is possible conveniently to control, within a reasonable range, the degree to which the plaster is super-fired by controlling the rotational speed of the conveyer screws, and/or controlling the temperature of the gas flow in a combustion chamber. Moreover, the super-firing operation can selectively be applied to any desired fraction of the plaster by simply altering the percentage amount of the plaster discharged from the drum that is fed to the input screw unit.

The hot gases flowing through the enclosure surrounding the grinding and burning drum may be derived from any suitable source, e.g. from a liquid fuel burner or a gas or powdered fuel burner which can be mounted either in the enclosure itself or in a primary combustion chamber connected with the enclosure so as to discharge the combustion gases over a flow path around the drum, and in such case the super-firing of the plaster can desirably proceed within such combustion chamber and the conveyer screw units can be installed in the bottom of this chamber.

An illustrative embodiment of apparatus according to the invention and exemplary modifications thereof will now be described for explanatory purposes but in no restrictive sense, with reference to the accompanying diagrammatic drawings, wherein:

Fig. 1 is an axial sectional view of the apparatus on the plane I—I in Fig. 2;

Fig. 2 is the cross section on the plane II—II in Fig. 1;

Figs. 3 and 4 are views respectively corresponding to Figs. 1 and 2 illustrating a modified form of apparatus.

As shown in Figs. 1 and 2, plaster producing apparatus according to one form of the invention comprises a hopper 1 for crude gypsum material, provided at its lower outlet with a volume-metering feeder device 2 of a conventional type including equal-volume sockets or compartments driven in rotation at a controlled angular velocity from motor means including a velocity control and regulating device 2a which may suitably be electronic in character. Material metered by the feeder device 2 drops by way of a vertical chute 3 on to one end of a screw conveyor 4 which is rotated from a source of power so as to feed the material into the axial inlet aperture 5 of a drum unit 6 according to the invention. It will be understood that the drum unit is mounted in axially aligned end journals in a supporting frame, said journals being provided in the form of tubular members, as diagrammatically shown. The tubular journal 5 at the inlet end of the drum provides the inlet aperture for feeding material into the drum, while the tubular journal 11 at the opposite end provides a similar outlet aperture.

A gear annulus 7 fixed coaxially around the periphery of the drum 6 serves to drive the drum at an appropriate velocity from any desired source of power, not shown. The walls of drum 6 may be made from an appropriate grade of sheet steel and it is generally found unnecessary to provide the heavy internal lining which is frequently provided in rotary crusher drums, since gypsum is not highly abrasive. The absence of such lining will usually improve the rate of heat exchange within the drum and improve the thermal efficiency of the process. One or more perforate walls or grates such as 8—8a, are provided across the drum 6 to divide its inner space into adjacent compartments such as 6a and 6b which contain crusher elements such as metal balls, rods, and the like, or pebbles, or any other appropriate elements for reducing the gypsum into a fine powder, the degree of fineness increasing from each compartment to the next.

The perforate wall 8 comprises an annular portion through which a plurality of small perforations are formed and having a relatively large-diameter central aperture for inspection purposes adapted to be shut off by means of an element 8a formed with cross-bars. The compartment 6b is defined at its remote end by a perforate cross wall 9 similar to the wall 8 but having a frustoconical outlet funnel 10 projecting from its central aperture towards the outlet pipe 11 for the discharge thereinto of the ground plaster material.

Surrounding a major central part of the drum is an enclosure 12 which is generally tunnel-shaped and is made from refractory material. Internally of the enclosure is a short vertical partition 13 reaching up to a point closely spaced from the bottom of the drum 6 so as to divide the enclosure into a pair of chambers 14a and 14b which communicate by way of a gap 14c defined between the top of the enclosure and the drum.

Mounted in the chamber 14a is a burner 15 which may be of a type burning liquid fuel. Chamber 14b communicates by way of a conduit 16 with the inlet of a suction fan 17 serving to draw the combustion gases from out of the chamber and discharge them into an upstanding stack 18 having an adjustable flapper valve 19 at its top. A branch conduit 20 connects with the stack near the top of the latter and has its other end connected with the feeder chute 3 for recycling the combustion gases as presently described. The outlet aperture 11 formed in the tubular journal opens into a vertical conduit 21 having an upward portion serving as a gas discharge stack and a downward portion 21a for the discharge of the product material.

Further, in the construction shown in Figs. 1 and 2, means are provided for withdrawing part of the crushed and partly calcined material from out of the compartment 6a in drum 6 into the surrounding enclosure 12, and such means are shown in the form of replaceably mounted grating elements 8b inserted in the peripheral wall of the drum 6. The material diverted into the outer enclosure is there exposed to super-firing conditions and the resulting material is withdrawn from the enclosure by a suitable extractor device, such as an extractor drum 22 positioned in a bottom outlet 12a. Within the chamber 14a of the enclosure is a short upstanding transverse wall 14d for protecting the heap of material to be super-fired from the open flame of the burner 15.

In operation, coarse crushed gypsum material is placed in the hopper 1 and the volume metering feeder 2 is set into rotation to feed the lumps of gypsum into the screw conveyor 4 at a feed rate correlated with the speed of rotation of the screw. The material is conveyed by screw 4 into and through the axial inlet 5 into the drum. As previously noted, the rate of rotation of the feeder and screw may be regulated by any suitable regulating equipment, such as an electronic servo-regulator not shown.

The lumps of gypsum within the drum 6 are simultaneously exposed to the crushing and grinding action of the grinder elements therein and to the heat supplied thereto by way of the heated gases from burner 15 flowing through the heating enclosure and through the drum, whereby the gypsum is dehydrated concurrently as it is ground into a fine powder.

Because of the longitudinal separating wall 13 in the enclosure, the heated gases are constrained to flow around the drum and heat the entire outer surface of the latter. The gases are then discharged by the fan 17 into the stack 18 and a part of them is recycled by way of a conduit 20 into the feeder chute 3 to enter the drum 6 by way of the axial inlet 5 together with the raw gypsum material. The gases advancing through the drum with the materials being ground therein contribute to the dehydration of the latter and finally issue out of the stack 21 while the ground gypsum plaster powder is discharged by gravity through the lower extension 21a of the stack. The fan 17 acts to maintain a slight degree of negative pressure within the enclosure 12 and a somewhat larger positive pressure within the drum so that the gases are readily discharged through the stack 21. A scraper bar 23 is mounted within the outlet opening 11 to scrape out the finished plaster powder and facilitate its discharge into the outlet 21a.

The finer fraction of the powder produced in compartment 6a is discharged from said compartment through the peripheral apertured elements or grates 8b into the outer enclosure and in the chamber 14a of the latter where it is heated to a high temperature by the combustion gases flowing over the top of the separation 14d, and this super-fired plaster material is then discharged by way of the drum extractor 22. The flap 19 is preferably held fully open during an initial period of operation following ignition of the kiln and until the combustion gases have attained their final composition.

In the modified embodiment of the invention shown in Figs. 3 and 4, similar parts have been designated by the same reference numbers as in Figs. 1 and 2, and only the parts differing from the first embodiment of the invention will be explicitly described. In this modification, the perforate elements 8b in the side wall of the drum are omitted, so that none of the contents of the drum 6 is able to enter the enclosure 12 through the drum wall. However, the product material discharged out of the discharge chute 21a is here received in a hopper 24 formed with two diverging outlets 25 and 26 provided with the respective valves 25a and 26a adapted to be individually operated to open and closed position. A primary combustion chamber 27 is formed at the bottom of the enclosure 12 and extends over somewhat more than one half the width of said enclosure and preferably throughout the full length of it. The burner nozzle 15 is disposed in one end of this chamber. The top of the chamber is in the form of an arch 28 and one side is defined by a vertical wall 29 formed with apertures such as slots 30 for allowing the combustion gases into the enclosure 12 to heat the drum 6. Gas circulation around the drum is facilitated by the provision of a vertical partition 13a extending up into close proximity or contact with the side of the drum 6 and positioned between the wall 29 defining the combustion chamber 27 and the outer vertical wall 12a of the enclosure 12.

A pair of substantially parallel transversely spaced conveyer screws 31 and 32 are positioned near the bottom of the chamber 27 and the operating shafts of said screws are tubular for circulation through them of cooling air delivered by a fan 33. At least one of these screws, such as the screw 32, projects beyond the end of the enclosure 12 through a sealed casing 34 to a point just underneath the outlet 25 of discharge hopper 24, at which point the top of casing 34 has a hole in it for receiving the powder material discharged from said outlet 25. Extending between the two coveyer screws 31 and 32 is a vertical wall 35 and the screws are rotated in opposite directions so that, referring to Fig. 3; material is fed rightward by the screw 32 and leftward by the screw 31. The separating wall 35 near that end adjacent to the fan 33 has a break in it so that material delivered thereto by way of screw 32 is taken up by the screw 31 to be thereby discharged at the opposite end of the channel 34 into receiving hopper 36 positioned below an aperture, not shown, formed in the bottom wall of the enclosure 34.

Thus the burned and ground plaster material is conveyed over a two-way path of travel through the combustion chamber 27 by way of screw 32 and then screw 31, and during this travel the plaster material is directly exposed to the action of the hot combustion gases and is thus subjected to a controllable "superfiring" action the extent of which can be modified by action on three different factors, namely: gas temperature, the percentage amount of burned plaster material fed back by way of the screw 32 and the time of such action as determined by the rate of rotation of the screws.

It will be understood that various modifications may be introduced into the constructional forms disclosed, as by combining features described in connection with Figs. 3 and 4, with other features described in the embodiment shown in Figs. 1 and 2. In this respect, the primary combustion chamber 27 and the arrangement of vertical wall 13a as shown in Fig. 4, may if desired be associated with the drum construction including peripheral grate sections as shown in Fig. 1. In such case the screw conveyers 31 and 32 and the associated cooling fan would be omitted, and an opening would be formed in the arch 28 to allow the ground plaster powder at a desirable degree of fineness, as discharged through the peripheral grating members, to enter the combustion chamber by way of said top opening. The drum 6 would then preferably be driven in the reverse direction from that indicated by the arrow F in Fig. 4, in order to avoid plaster powder from building up in the space between the partition 13a and wall 12a, and an extractor device for the superfired plaster would be provided in a similar manner to that described in connection with the first embodiment.

In either construction, an expansion seal of conventional type as schematically shown at 37 in Fig. 3 is preferably provided at both ends of the enclosure 12 to prevent the heated gases from issuing out through the space between the stationary end walls of the enclosure and the movable periphery of drum 6.

The following numerical data is given as an example of one set of operating conditions which has afforded successful practical results.

If the effective inner diameter of the drum 6 expressed in meters is D, then a suitable angular velocity for the drum in revolutions per minute is given by the formula $V=30/\sqrt{D}$. The granulometry of the gypsum stock fed to the apparatus is in the range 0–25 millimeters diameter.

In the enclosure 12 the temperature is on the order of 800° C. near the burner end about 300° C. at the outlet from chamber 14b. The gases entering the pipe 3 at the temperature of 300° C. issue at about 100° C. through the stack 21. In such conditions, the wall of drum 6 is at a temperature of about 160° C., and the finished material issuing at 21a is substantially at the same temperature.

The fan 17 is operated to generate within the enclosure 12 a negative pressure of about 5 mm. water, and the gas discharged by the fan is at a pressure of about 50 mm. water. In this way a superatmospheric pressure of about 10 mm. water is maintained in the drum 6.

Various modifications other than those specifically mentioned may be introduced within the scope of the invention.

What I claim is:

1. In apparatus for concurrently grinding and dehydrating a hydrated raw material in lump form, in combination, a rotatable container, aligned axial inlet and outlet apertures in opposite ends of the container for feeding said raw material thereinto and discharging product material therefrom respectively, at least one charge of loose grinding elements in the container, an enclosure surrounding the container, means for providing a gaseous heating medium in the enclosure for circulation around the container, means for feeding at least a portion of said medium from said enclosure into said inlet for delivery through the container together with said material, perforate means in the peripheral wall of the container for diverting a fraction of said material from the container into said enclosure for exposure to high-temperature conditions therein, and means for discharging said exposed fraction of said materials from said enclosure.

2. Apparatus as claimed in claim 1, wherein said perforate means comprise replaceable perforate wall sections of said peripheral container wall.

3. In apparatus for concurrently grinding and dehydrating hydrated raw material, in combination, a revolving drum, aligned axial inlet and outlet apertures in the ends of the drum for the feed of raw material and the discharge of product material respectively, loose grinding elements in the drum, an annular jacket surrounding the drum, means for providing a gaseous heating medium in said jacket and for circulating said medium in the jacket around the drum periphery, means for feeding at least a portion of said medium from the jacket into the drum inlet for delivery through the drum, a pair of screw conveyers extending in general parallel contiguous relation from a point adjacent said drum outlet into said jacket, means for supplying to one conveyer a controllable fraction of said product material from said outlet for delivery by said one conveyer into said jacket for exposure therein to high-temperature firing conditions, and means for passing said material from said one conveyer to the adjacent end of the other conveyer within said jacket for delivery by said other conveyer out of the jacket and back towards said outlet.

4. In apparatus for concurrently grinding and dehydrating a hydrated raw material in lump form, in combination, a rotatable drum, said drum having opposing ends provided with aligned axial inlet and outlet apertures for feeding said raw material and discharging product material respectively, at least one charge of loose grinding elements in said drum, an annular enclosure surrounding said drum over at least the mid-portion thereof, means providing a gaseous heating medium in said enclosure for circulation therein around the drum periphery, means for feeding at least a portion of said heating medium from said enclosure into said inlet aperture for delivery through said drum together with said material, first conveyer means extending from said drum outlet into said enclosure to the end thereof adjacent the inlet of said drum for feeding a controllable fraction of said product material into said enclosure for exposure to high temperature conditions therein, second conveyer means extending from the end of said enclosure adjacent the inlet of said drum to at least the opposite end of said enclosure and out thereof for discharging said fraction of product material exposed to high temperature from said enclosure, prime mover means operatively connected with said first conveyer means, coupling means connecting said first and second conveyer means for discharging at any moment from said enclosure a volume of product material exposed to high temperature equal to the volume of product material fed into said enclosure, and speed varying means interposed between said first conveyer means and said prime mover means for controlling the period during which the product material fed into said enclosure is exposed to high temperature condition.

5. In apparatus for concurrently grinding and dehydrating a hydrated raw material in lump form, in combination, a rotatable drum, said drum having opposing ends provided with aligned axial inlet and outlet apertures for feeding said raw material and discharging product material respectively, at least one charge of loose grinding elements in said drum, an annular enclosure surrounding said drum and having a base portion, means defining a combustion chamber communicating with the base portion of said enclosure, fuel burner means in said chamber to provide a gaseous heating medium in said enclosure, means for circulating said heating medium around the drum periphery, means for feeding at least a portion of said heating medium from said enclosure into said inlet for delivery through the drum together with said material, a conveyer screw extending from said drum outlet into said combustion chamber for feeding back a controllable fraction of said product material into said chamber for exposure to high temperature conditions therein, and means for discharging said exposed fraction of materials from said chamber.

6. A method of producing gypsum plaster, which comprises feeding raw gypsum material to a treating zone, grinding the material in said zone, circulating a heated gaseous medium around said zone for heating the same from outside, delivering a current of a heated gaseous medium through said zone further to dehydrate the material within the zone as it is being ground, and diverting a controllable fraction of the material from said zone into the gaseous medium circulating around the treating zone to expose said fraction to superfiring conditions.

References Cited in the file of this patent

UNITED STATES PATENTS

| | | |
|---|---|---|
| 155,257 | Reid | Sept. 22, 1874 |
| 1,185,899 | Geiger | June 6, 1916 |
| 1,690,068 | Eckfeldt | Oct. 30, 1928 |
| 1,802,196 | Cheesman | Apr. 21, 1931 |
| 2,057,099 | Ingraham | Oct. 13, 1936 |
| 2,217,665 | Brown | Oct. 15, 1940 |
| 2,637,545 | Hicguet | May 5, 1953 |
| 2,676,010 | Matthies | Apr. 20, 1954 |

OTHER REFERENCES

| | | |
|---|---|---|
| 405,456 | Germany | Oct. 31, 1924 |